(12) United States Patent
Johansson

(10) Patent No.: US 8,722,553 B2
(45) Date of Patent: May 13, 2014

(54) WOVEN AIRBAG FABRIC

(75) Inventor: Mats Johansson, Aplared (SE)

(73) Assignee: Autoliv Development AB, Vargarda (SE)

( * ) Notice: Subject to any disclaimer, the term of this patent is extended or adjusted under 35 U.S.C. 154(b) by 291 days.

(21) Appl. No.: 13/127,728

(22) PCT Filed: Nov. 6, 2009

(86) PCT No.: PCT/SE2009/051259
§ 371 (c)(1),
(2), (4) Date: May 5, 2011

(87) PCT Pub. No.: WO2010/053440
PCT Pub. Date: May 14, 2010

(65) Prior Publication Data
US 2011/0210532 A1  Sep. 1, 2011

(30) Foreign Application Priority Data

Nov. 7, 2008 (SE) ...................... 0802363

(51) Int. Cl.
*D03D 11/00* (2006.01)
*B60R 21/235* (2006.01)

(52) U.S. Cl.
USPC ................... 442/209; 280/728.1; 280/743.1; 442/60; 442/76; 442/208

(58) Field of Classification Search
CPC .............................. D03D 1/02; B60R 21/235
USPC ............. 442/60, 76, 104, 164, 168, 170, 189, 442/203, 208, 209, 212, 213, 215, 216, 217, 442/218, 243; 428/34.1, 34.5, 34.6, 36.1, 428/36.2, 98, 103; 280/728.1, 730.1, 743.1
See application file for complete search history.

(56) References Cited

U.S. PATENT DOCUMENTS

| 5,215,795 | A | 6/1993 | Matsumoto et al. |
| 5,401,566 | A | 3/1995 | Magee et al. |
| 5,700,870 | A | 12/1997 | Mueller et al. |
| 6,200,915 | B1 | 3/2001 | Adams et al. |
| 6,632,754 | B1 | 10/2003 | Rose, III et al. |
| 2003/0192934 | A1 | 10/2003 | Pedicini et al. |

FOREIGN PATENT DOCUMENTS

| DE | 4206997 A1 | 9/1993 |
| EP | 0646672 A1 | 4/1995 |
| EP | 0866164 A1 | 9/1998 |
| EP | 0953675 A2 | 11/1999 |
| WO | WO 98/06570 A1 | 2/1998 |

OTHER PUBLICATIONS

International Search Report for PCT/SE2009/051259, ISA/SE, Stockholm, mailed Mar. 3, 2010.

*Primary Examiner* — Arti Singh-Pandey
(74) *Attorney, Agent, or Firm* — Harness, Dickey & Pierce, P.L.C.

(57) ABSTRACT

A woven airbag fabric includes a first type of filament yarn, at least a second type of filament yarn and a silicone-based coating. The first type of filament yarn is chosen from the group of polyolefin filament yarns. The at least a second type of filament yarn is chosen from the group of polyamide and polyester filament yarns.

18 Claims, 1 Drawing Sheet

WOVEN AIRBAG FABRIC

CROSS-REFERENCE TO RELATED APPLICATIONS

This application is a 371 U.S. National Stage of International Application No. PCT/SE2009/051259, filed Nov. 6, 2009 and published in English as WO 2010/053440 A1 on May 14, 2010. This application claims the benefit of Swedish Patent Application No. SE 0802363-2, filed Nov. 7, 2008. The disclosures of the above applications are incorporated herein by reference.

TECHNICAL FIELD

The present invention relates to a woven airbag fabric.

TECHNICAL BACKGROUND

Airbags are widely used in motor vehicles to protect the occupants in case of an impact event. Upon actuation of such an airbag it is inflated with gas produced or supplied by an airbag inflator. Airbags are often sewn from a woven fabric formed by weaving techniques which are well known in the art. Airbag fabrics need to fulfil a number of requirements. For instance, they need to be flexible to enable folding of an airbag formed thereof to fit inside an airbag housing. Also, airbag fabrics need to be strong enough to withstand high stresses during inflation of the airbag. Furthermore, it is realised that airbag fabrics are exposed to a wide range of ambient temperature conditions and that they need to preserve their material performance during a long time. It is known to provide a woven airbag fabric with a coating in order to improve the heat resistance and reduce the permeability thereof.

Typically, woven airbag fabrics are today formed from a polyamide yarn.

SUMMARY OF THE INVENTION

An object of the present invention is to provide an improved airbag fabric.

This and other objects are achieved by a woven airbag fabric comprising a first type of filament yarn, said first type of filament yarn being chosen from the group of polyolefin filament yarns, and at least a second type of filament yarn, said second type of filament yarn being chosen from the group of polyamide and polyester filament yarns, said woven airbag fabric comprising a silicone-based coating.

The silicone-based coating serves to improve the heat resistance and to reduce the permeability of the woven airbag fabric. The adhesion of the coating is crucial to secure a proper function of the coated fabric. If the coating is not adhered to the fabric in a proper manner it may release from the fabric. The coating must not release from the woven fabric due to, for instance, abrasion, which may appear during folding of an airbag formed from the woven fabric to fit inside an airbag housing. Also, the coating must not release during storage or during inflation of such an airbag. During inflation an airbag may be inflated with hot gases which could damage the airbag fabric if it is not coated in a proper manner.

Silicone-based coating materials are generally preferred due to their ability to withstand varying environmental and storage conditions for long periods of time. The woven airbag fabric comprises a first type of filament yarn being a polyolefin filament yarn. The adhesion of a silicone-based coating on polyolefin filament yarns is, however, very poor. On the other hand, the adhesion of a silicone-based coating on polyamide filament yarns and polyester filament yarns is very good. In order to achieve a proper coating of the woven airbag fabric it therefore comprises also a second type of filament yarn to which the adhesion of a silicone-based coating is very good.

An advantage of the present invention is that a polyolefin filament yarn can be used in a coated woven airbag fabric although a silicone-based coating does not adhere to such filament yarns in a proper manner. Instead, the silicone-based coating adheres to a second type of filament yarn used in the woven fabric. Thus, a less expensive woven airbag fabric may be provided since polyolefin filament yarns are often less expensive than polyamide filament yarns and polyester filament yarns. Also, weight reductions are enabled since the density of polyolefin filament yarns is normally lower than the density of polyamide and polyester filament yarns. Weight reductions of components are today very important in the development of vehicles in order to reduce the fuel consumption and emissions of vehicles. Thus, a woven airbag fabric that takes the advantage of the low cost and low weight of polyolefin filament yarns and the ability to receive a coating of the second type of filament yarn is provided.

Furthermore, a woven airbag fabric that exhibits high strength and low permeability that works properly in a wide range of ambient temperature conditions, such as a temperature interval of −40 to 100° C., is achieved.

The first type of filament yarn is preferably polypropylene filament yarn. Thus, a cost-effective airbag fabric is provided since the woven fabric is partly formed from polypropylene filament yarn, which are less expensive than yarn formed from for instance polyamide 6.6.

The second type of filament yarn is preferably polyamide filament yarn, such as polyamide or polyamide 6.6. Most preferably, the second type of filament yarn is polyamide 6.6 filament yarn, which exhibits particularly good adhesion to silicone-based coatings.

Preferably, the woven airbag fabric comprises at least 25 percent by weight of said first type of filament yarn, more preferably at least 35 percent by weight of said first type of filament yarn and most preferably at least 40 percent by weight of said first type of filament yarn, based on the total filament yarn weight of said woven airbag fabric. Since the second type of filament yarn often is less expensive and the weight thereof normally is lower compared to the second type of filament yarns it is desired to minimize the amount of the second type of filament yarn. However, a certain amount of the second type of filament yarn is preferable to provide sufficient adhesion of the silicone-based coating to the woven fabric.

The woven airbag fabric preferably contains at least 30 percent by weight of the second type of filament yarn, based on the total filament yarn weight of said woven airbag fabric. An advantage of this embodiment is that a firm adhesion of the silicone-based coating is achieved. More preferably the woven airbag fabric contains 30-70% by weight of the second type of filament yarn, and still more preferably 40-60% by weight of the second type of filament yarn, based on the total filament yarn weight of said woven airbag fabric. An advantage of this is that a good adhesion of the silicon-based coating in combination with low weight and low cost is achieved.

Preferably, weft threads of said woven airbag fabric are formed from one of said first type of filament yarn and said second type of filament yarn, and warp threads are formed from the other one of said first type of filament yarn and said second type of filament yarn. Thus, the fabric may be woven in a particularly cost-effective manner.

Preferably, the weft threads of said woven airbag fabric are formed from said first type of filament yarn. Since a polyolefin filament yarn has lower density than the second type of filament yarn, the polyolefin filament yarn is preferably used in the weft direction to enable faster weaving of an airbag fabric. Faster weaving is enabled since the threads of the polyolefin yarn may, due to the lower density, have a larger diameter and thus each thread may cover a larger surface. Preferably, the warp threads of said woven airbag fabric are formed from said second type of filament yarn.

Preferably, the first type of filament yarn has a yarn tenacity of at least 5 g/den, more preferably at least 6 g/den and most preferably at least 7 g/den in order provide a woven airbag fabric suitable for a variety of airbag applications. It will be appreciated that den=denier which unit in the SI-system corresponds to the weight expressed in g of 9000 m filament yarn. Furthermore, 1 g/den=0.0883 N/tex. It has been found that coated fabrics woven from such a high-strength polyolefin filament yarn combined with for instance polyamide filament yarn is comparable to a coated fabric woven from solely polyamide filament yarn as regards the strength and performance thereof. It is thus possible to use such a coated fabric comprising polyolefin filament yarn in a variety of airbag applications.

Preferably, the polyolefin filament yarn has a yarn tenacity of 5-10 g/den, more preferably 6-9 g/den and most preferably 6.5-8 g/den in order to provide a woven airbag fabric suitable for a variety of airbag applications.

Preferably, the first type of filament yarn has a linear density in the range from 110 dtex to 940 dtex, more preferably in the range from 220 dtex to 700 dtex and most preferably in the range from 330 dtex to 550 dtex in order provide a woven airbag fabric suitable for a variety of airbag applications.

Preferably, the second type of filament yarn has a yarn tenacity of 5-10 g/den, more preferably 6-9 g/den and most preferably 6.5-8 g/den.

Preferably, the second type of filament yarn has a linear density in the range from 110 dtex to 940 dtex, more preferably in the range from 235 dtex to 700 dtex and most preferably in the range from 400 dtex to 550 dtex.

The woven airbag fabric is preferably a plain weave and more preferably a 1/1 plain weave. Thus, an even distribution of the second type of filament yarn is achieved, which results in a good adhesion of a silicon-based coating to the woven airbag fabric. Furthermore, a fabric having well balanced characteristics, such as strength in different directions of the fabric may be provided. That is, the fabric will behave in a similar manner independently of the direction of a load applied to the fabric. Also, the strength as regards seams joining different woven fabric parts, is high. Furthermore, a tight fabric is achieved by a plain weave, which is advantageous since an airbag fabric having high seam strength and low permeability is desired.

BRIEF DESCRIPTION OF THE DRAWINGS

The present invention will now be described in more detail with the reference to the accompanying schematic drawings which shows an embodiment of the invention and in which.

TECHNICAL DESCRIPTION

As used in the present description, "filament yarn" refers to a yarn which is made from a multitude of individual fibers or filaments, e.g. 10-500 individual fibers or filaments, that have been attached to each other, for example by means of a spinning process, to form said filament yarn. When said filament yarn has been utilized for weaving a fabric, the pieces of said yarn making up the woven fabric are referred to as "threads". It will be appreciated that each such thread comprises the same number of individual fibers or filaments as the filament yarn from which the thread originates.

Furthermore, "warp threads" refers to threads running along the length of a woven fabric and "weft threads" refers to threads running across the length of a woven structure.

Figure 1:
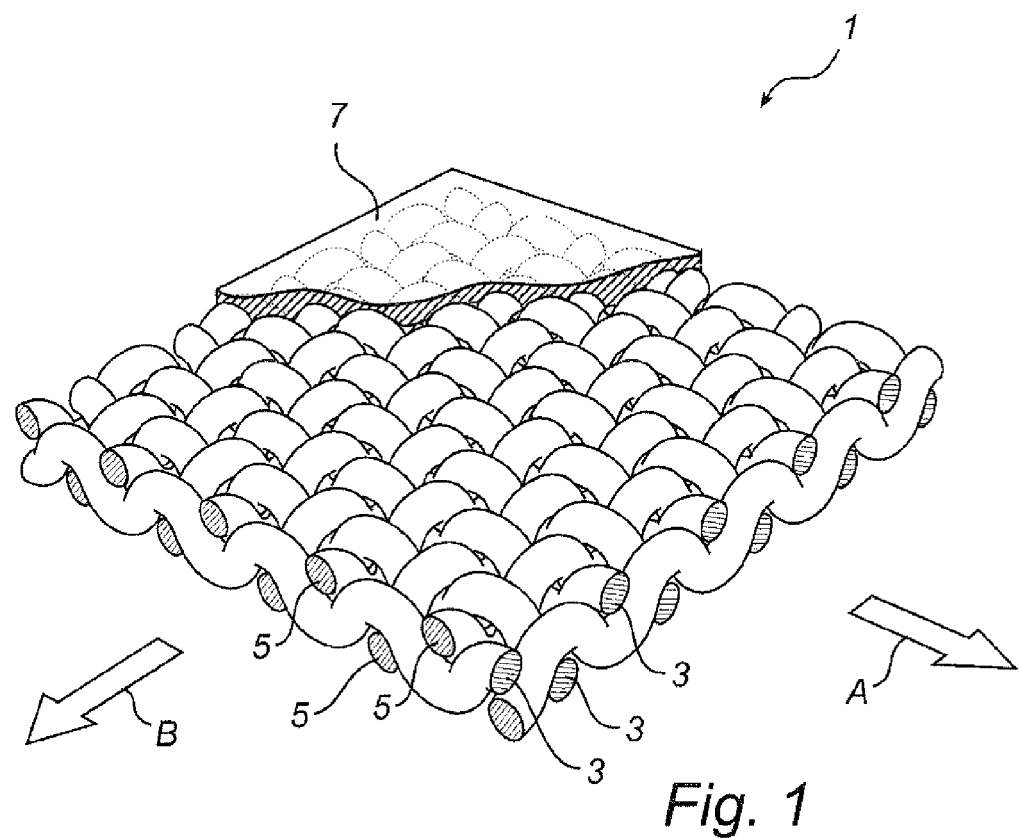
FIG. 1 shows a part of a woven airbag fabric.

A woven airbag fabric 1 according to an embodiment of the present invention is shown in FIG. 1. The fabric 1 is a 1/1 plain weave. In a 1/1 plain weave each weft thread passes over and under each warp thread in alternating rows. Alternatively, the fabric may be woven in a weave that origins from this type of weave, but is woven in another weaving pattern, such as in a 2/2, 2/1, 1/2 or similar weave. It is realized that such a fabric 1 may be woven by any suitable weaving process, such as weaving processes that are per se known and include rapier, fluid jet, air-jet or projectile-type looms.

The woven fabric 1 comprises threads 3 of a first type of continuous filament yarn arranged in a first direction, also referred to as the weft direction, and threads 5 of a second type of continuous filament yarn arranged in a second direction, also referred to as the warp direction, the second direction being, as illustrated in FIG. 1, substantially perpendicular to said first direction. The first direction, i.e. the weft direction, is indicated by arrow A and the second direction, i.e. the warp direction, is indicated by arrow B. Threads arranged in the weft direction A are also referred to as weft threads 3 and threads arranged in the warp direction B are also referred to as warp threads 5.

The woven airbag fabric 1 comprises threads 3 of a first type of filament yarn, in this case polypropylene (PP) filament yarn. The woven airbag fabric 1 further comprises threads 5 of a second type of filament yarn, in this case polyamide 6.6 (PA 6.6) filament yarn. In this embodiment the threads 3 of polypropylene filament yarn are arranged in the weft direction, and the threads 5 of polyamide 6.6 filament yarn are arranged in the warp direction. The airbag fabric 1 is thus a 1/1 plain weave having weft threads formed from polypropylene and warp threads formed from polyamide 6.6. Alternatively, threads of polypropylene filament yarn may be arranged in the warp direction and threads of polyamide 6.6 filaments yarn may be arranged in the weft direction.

In order to increase the strength of a filament yarn in handling and during weaving an intermingling of the yarn, which is well known in the art, may be carried out prior to weaving a fabric. Preferably, the polypropylene filament yarns are intermingled using 1-50 intermingle points per meter, more preferably 20-40 and most preferably 25-35 intermingle points per meter. In this case polypropylene filament yarn intermingled with in average 30 intermingle points per meter was used. Preferably, the polyamide or polyester filament yarns are intermingled using 1-50 intermingle points per meter, more preferably 15-40, and most preferably 20-30 intermingle points per meter. In this case a polyamide 6.6 filament yarn intermingled with in average 27 intermingle points per meter was used.

If an even higher "protection" of the yarn is needed, which especially may be the case when polypropylene yarn is used as warp yarn, twisting may be applied to the yarn prior to weaving.

Figure 2:
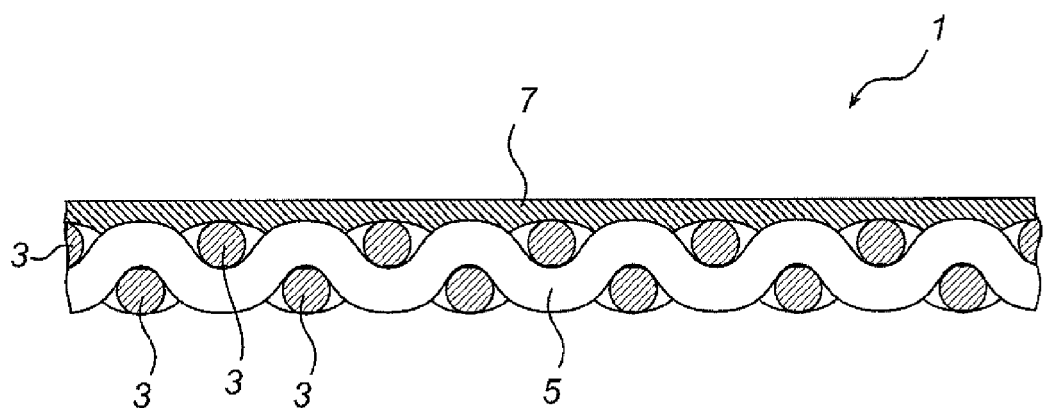
FIG. 2 shows the woven airbag fabric of FIG. 1, as seen in a sectional view.

The fabric 1 further comprises a silicone-based coating 7, as best illustrated in FIG. 2, which shows a cross-section of the woven airbag fabric 1. In FIG. 1, the silicone-based coating 7 is partly removed for clarity reasons. The silicone-based coating 7 mainly serves to improve the heat resistance and to reduce the permeability of the woven airbag fabric 1. The adhesion of the silicone-based coating 7 to the threads 5 of the second type of filament yarn is good and the woven fabric is thus coated in a proper manner since the threads 5 of the second type of filament yarns is evenly distributed over the woven fabric 1. Such a silicone-based coating 7 has very good performance in the temperature interval of interest for the actual airbag applications. The silicone-based coating may be applied to a woven fabric using techniques well known in the art, such as spraying, gravure coating, bar coating, coating by knife-over-roller, coating by knife-over-air, padding or screen-printing. A silicone-based coating may be applied to one or both sides of a woven fabric. Most preferably, a silicone-based coating is applied on the surface of the fabric 1 that, when an airbag is formed from the fabric, is meant to be exposed to gas from an airbag inflator, which means that a robust and flexible fabric having low permeability can be provided in a cost-effective manner.

A proper adhesion of the silicone-based coating is important to secure a proper function of the coated airbag fabric. The coated fabric need to withstand different types of mechanical impacts, such as abrasion, without releasing the coating. As mentioned above the adhesion of such a silicone-based coating to a polypropylene filament yarn is poor. On the other hand the adhesion of such a silicone-based coating to a polyamide or polyester filament yarns is very good. It has been found that if the amount of polyamide filament yarn or polyester filament yarn in the woven fabric is too low the coating may release from the surface, which would result in that the fabric no longer fulfils the performance requirements. In order to secure that the coating adheres to the woven fabric in a proper manner a certain amount of filament yarn of the second type, to which the adhesion of a silicone-based coating is very good, is thus needed. In this embodiment the airbag fabric contains 45 percent by weight of polypropylene filament yarn and 55 percent by weight of polyamide 6.6 filament yarn.

By having a certain amount of the second type of filament yarn a fabric capable of receiving a silicone-based coating a firm adhesion of the silicone-based coating is achieved.

The invention will now be described in more detail with reference to the following example and results from tests carried out in accordance with standardized test methods for airbag fabrics.

EXAMPLE 1

An airbag fabric was woven in a 1/1 plain weave construction using a rapier weaving machine. Polyamide 6.6 (PA 6.6) filament yarn was used in the warp direction and polypropylene (PP) filament yarn was used in the weft direction. Of the total filament yarn weight of said woven fabric in example 1, 45 percent by weight was PP filament yarn, and 55 percent by weight was PA 6.6 filament yarn. The PA 6.6 filament yarn was 470 dtex f.136 type 749 supplied from INVISTA U.K., Brockworth, Glouester, ENGLAND. The PP filament yarn was of the type T-0567 supplied from INDUSTRIAS MURTRA SA, Granollers, Barcelona, Spain.

The woven fabric was coated, after the weaving, with a silicone-based coating having a coating weight of approximately 25 g/m2 to form the woven airbag fabric. Table 1 shows a specification of the filament yarns used in example 1. The silicone-based coating was of the type Rhodorsil TCS supplied from Bluestar Silicones, Lyon, France.

TABLE 1

|  | PP filament yarn | PA 6.6 filament yarn |
|---|---|---|
| Yarn count | 467 dtex | 480 dtex |
| Filaments count | 74 | 136 |
| Density | 0.91 kg/m3 | 1.14 kg/m3 |
| Tenacity | 7.3 g/den | 7.6 g/den |
| Elongation | 24% | 24% |
| Shrinkage | 5% | 6.6% |
| Intermingled points | 30 Points/m | 27 Points/m |

Reference Fabrics

A first reference fabric, which is known in the art and widely used in a variety of airbag applications today, was used. The first reference fabric was formed from 100% PA 6.6 filament yarn of the same type as was used in Example 1, as specified in Table 1. The first reference fabric was coated with the same type of silicone-based coating was used in example 1, i.e. a silicone-based coating having a coating weight of approximately 25 g/m2.

A second reference fabric woven from 100% polypropylene (PP) filament yarn of the same type as was used in example 1, as specified in Table 1. The second reference fabric was coated with the same type of silicone-based coating as was used in example 1, i.e. a silicone-based coating having a coating weight of approximately 25 g/m2.

In order to evaluate the woven fabric described in example 1 above and to be able to compare the characteristics thereof to reference fabrics number of tests in accordance with standardized test methods for airbag fabrics were carried out. In Table 2 some of the test results are summarized. All tests were carried out in accordance with the standards listed in EASC 9904 0180 (European Airbag Standardization Committee), "Stating requirements and test conditions". For instance the flex abrasion (scrub) tests in accordance with ISO 5981, described in the above mentioned standards, were carried out in order to evaluate the adhesion of the silicon-based coating applied to the fabrics.

TABLE 2

|  | Unit | First ref. fabr. (PA 6.6) | Sec. ref. fabr. (PP) | Example 1 (PA 6.6-PP) |
|---|---|---|---|---|
| Yarn count weft | dtex | 480 | 467 | 467 |
| Fabric set weft | threads/cm | 20.5 | 19 | 19 |
| Weight | g/m2 | 258 | 235 | 246 |
| Tensile strength weft | N/5 cm | 3200 | 2800 | 2800 |
| Elongation weft | % | 38 | 32 | 30 |
| Air permeability, uncoated material | l/dm2/min | 5.86 | 8.20 | 6.26 |
| Flex abrasion | strokes | >600 | <20 | >600 |

As can be seen in Table 2 the material performance of the woven fabric of example 1 is comparable to the first reference fabric. The second reference fabric has a very poor result in the Flex abrasion tests, which indicates that the second reference fabric is not capable of receiving a silicone-based coating in a proper manner and is thus not suitable for airbag applications.

It is thus realized that it is possible to meet the very high demands of woven airbag fabrics using polypropylene in combination with for instance polyamide 6.6 as yarn material. It has thus been found that polypropylene filament yarn can be combined with polyamide 6.6 yarn in a woven fabric to form a fabric capable of receiving a silicone-based coating in a proper manner. It is also realized that a woven fabric comprising polypropylene filament yarn and a second type of filament yarn, such as polyamide filament yarn, is suitable for a variety of airbag applications.

Referring to table 2 it should be noted that the fabric set is lower in Example 1 compared to the first reference fabric. This is a result of the lower density of polypropylene that gives a larger diameter of the thread. The cover factor however remains almost the same as indicated by the air permeability of the woven fabric prior to coating with a silicone-based coating.

It will be appreciated that the described embodiment of the invention can be modified and varied by a person skilled in the art without departing from the inventive concept defined in the claims.

It is for instance realised that a woven airbag fabric in one embodiment may comprise more than two types of filament yarns. That is, in one embodiment a woven airbag fabric may comprise a first type of filament yarn chosen in the group of polyolefin filament yarns, such as polypropylene filament yarn, a second type of filament yarns, such as polyamide filament yarn and a third type of filament yarn, such as polyester filament yarn.

The woven airbag fabric 1 described above comprises threads 3 of polypropylene (PP) filament yarn. In an alternative embodiment the first type of filament yarn may be another filament yarn chosen in the group of polyolefin filament yarns, said group including, in addition to polypropylene filament yarns, polyethylene (PE) filament yarn The woven airbag fabric 1 described above further comprises threads 5 of polyamide 6.6 (PA 6.6) filament yarn. In an alternative embodiment the second type of filament yarn may be another type of filament yarn chosen in the group comprising polyamide filament yarns, including, for example, polyamide 6, polyamide 4.6, and the above referenced polyamide 6.6, and polyester filament yarns.

The invention claimed is:

1. A woven airbag fabric consisting of:
   a first type of filament yarn, said first type of filament yarn being a polyolefin filament yarn;
   at least a second type of filament yarn, said second type of filament yarn being either a polyamide filament yarn or a polyester filament yarn; and
   a silicone-based coating on a surface of the fabric to be exposed to gas from an airbag inflater,
   wherein the silicone-based coating adheres to the second type of filament yarn.

2. The woven airbag fabric according to claim 1, wherein the first type of filament yarn is polypropylene filament yarn.

3. The woven airbag fabric according to claim 1, wherein the second type of filament yarn is polyamide filament yarn.

4. The woven airbag fabric according to claim 3, wherein the second type of filament yarn is polyamide 6 filament yarn or polyamide 6.6 filament yarn.

5. The woven airbag fabric according to claim 1, wherein the fabric includes at least 30 percent by weight of the first type of filament yarn, based on a total filament yarn weight of the woven airbag fabric.

6. The woven airbag fabric according to claim 5, wherein the fabric includes at least 40 percent by weight of the first type of filament yarn, based on the total filament yarn weight of the woven airbag fabric.

7. The woven airbag fabric according to claim 1, comprising at least 30 percent by weight of the second type of filament yarn, and 40-60 percent by weight, based on a total filament yarn weight of the woven airbag fabric.

8. The woven airbag fabric according to claim 1, wherein weft threads are formed from one of the first type of filament yarn or the second type of filament yarn, and warp threads are formed from the other one of the first type of filament yarn or the second type of filament yarn.

9. The woven airbag fabric according to claim 8, wherein the weft threads are formed from the first type of filament yarn.

10. The woven airbag fabric according to claim 9, wherein the warp threads are formed from the second type of filament yarn.

11. The woven airbag fabric according to claim 1, wherein the first type of filament yarn has a yarn tenacity of 5-10 g/den.

12. The woven airbag fabric according to claim 1, wherein the woven airbag fabric is a plain weave.

13. The woven airbag fabric according to claim 1, wherein the first type of filament yarn has a linear density between 300 dtex and 550 dtex and the second type of filament yarn has a linear density between 235 dtex and 700 dtex.

14. The airbag accordingly to claim 13, wherein the first type of filament yarn is polypropylene and the second type of filament yarn is polyamide 6.6.

15. An airbag formed of a woven airbag fabric comprising:
    a first type of filament yarn, the first type of filament yarn being a polyolefin filament yarn;
    at least a second type of filament yarn, the second type of filament yarn being a polyamide filament yarn, a polyester filament yarn, or a combination thereof; and
    a silicone-based coating on a surface of the fabric to be exposed to gas from an airbag inflator.

16. The airbag according to claim 15, wherein the woven airbag fabric comprises weft yarns and warp yarns, wherein the weft yarns are the first type of filament yarn and the warp yarns are the second type of filament yarn.

17. The woven airbag fabric according to claim 16, wherein the fabric includes weft threads of polypropylene, and warp threads of polyamide 6.6.

18. A woven airbag fabric comprising:
    at least 25% by weight weft threads;
    30-70% by weight warp threads; and
    a silicone-based coating on a surface of the fabric to be exposed to gas from an airbag inflator,
    wherein the weft threads are a polyolefin, the warp threads are a polyamide or a polyester, and wherein the fabric behaves in a similar manner independently of a direction of a load applied to the fabric.

* * * * *